United States Patent
Heppner et al.

(10) Patent No.: US 10,721,280 B1
(45) Date of Patent: Jul. 21, 2020

(54) EXTENDED MIXED MULTIMEDIA REALITY PLATFORM

(71) Applicant: Sprint Communications Company L.P., Overland Park, KS (US)

(72) Inventors: Clyde Heppner, Liberty, MO (US); Lyle W. Paczkowski, Mission Hills, KS (US); James Victor Ralston, Lenexa, KS (US); Ryan Sullivan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 751 days.

(21) Appl. No.: 14/726,276

(22) Filed: May 29, 2015

(51) Int. Cl.
*H04L 29/06* (2006.01)
*H04L 29/08* (2006.01)
*G06F 3/0488* (2013.01)
*G06F 3/01* (2006.01)

(52) U.S. Cl.
CPC ............ *H04L 65/403* (2013.01); *G06F 3/017* (2013.01); *G06F 3/04883* (2013.01); *H04L 67/10* (2013.01)

(58) Field of Classification Search
CPC ....... H04L 65/403; H04L 67/10; G06F 3/017; G06F 3/04883; G06F 3/013; G06F 3/011; G06F 3/01; G02B 27/0172; G02B 27/0093; G02B 2027/0178; G02B 2027/0138; G02B 27/0101; G02B 27/017; G09B 19/24; A63F 2300/60
USPC .......................................................... 715/719
See application file for complete search history.

(56) References Cited

U.S. PATENT DOCUMENTS

| | | | | |
|---|---|---|---|---|
| 9,424,678 | B1* | 8/2016 | Enakiev | G06T 13/40 |
| 2012/0062357 | A1* | 3/2012 | Slamka | G01C 21/20 |
| | | | | 340/4.11 |
| 2013/0155169 | A1* | 6/2013 | Hoover | H04N 7/157 |
| | | | | 348/14.02 |
| 2014/0167954 | A1* | 6/2014 | Johnson | G08B 27/001 |
| | | | | 340/539.11 |
| 2014/0204077 | A1* | 7/2014 | Kamuda | A63F 13/335 |
| | | | | 345/419 |
| 2014/0320389 | A1* | 10/2014 | Scavezze | G06T 19/006 |
| | | | | 345/156 |
| 2015/0074506 | A1* | 3/2015 | Dunn | G06F 21/6218 |
| | | | | 715/230 |
| 2015/0215581 | A1* | 7/2015 | Barzuza | G06T 19/006 |
| | | | | 348/14.1 |
| 2015/0235435 | A1* | 8/2015 | Miller | G06T 19/006 |
| | | | | 345/633 |
| 2015/0331576 | A1* | 11/2015 | Piya | G06F 3/011 |
| | | | | 715/850 |

(Continued)

*Primary Examiner* — Sherrod L Keaton (57) ABSTRACT

In an embodiment, systems and methods disclosed herein relate to a mobile mixed reality platform that enables users in different physical locations in a building, city, state, or across the world to interact in a shared virtual environment during an interactive session. This virtual environment enables the sharing and generation of virtual elements such as documents and three-dimensional models, and immerses the users in the environment with wearable technology so that the users have an experience that mirrors real-time interactions in situations including professional meetings, training, and other interactions that involve parties from different physical locations who desire to have a shared, immersive, virtual environment for interaction.

20 Claims, 3 Drawing Sheets

(56) References Cited

U.S. PATENT DOCUMENTS

| | | | |
|---|---|---|---|
| 2016/0027216 A1* | 1/2016 | da Veiga | G02B 27/0172 |
| | | | 345/419 |
| 2016/0054837 A1* | 2/2016 | Stafford | G06F 3/012 |
| | | | 463/33 |
| 2016/0070356 A1* | 3/2016 | Aguirre | H04N 13/337 |
| | | | 345/156 |
| 2016/0300379 A1* | 10/2016 | Du | G06T 13/40 |
| 2016/0350973 A1* | 12/2016 | Shapira | G06T 19/006 |
| 2017/0017632 A1* | 1/2017 | York | H04N 7/15 |

* cited by examiner

EXTENDED MIXED MULTIMEDIA REALITY PLATFORM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Virtual (VR) reality is the term used to describe computer-generated simulations of three-dimensional actors and environments generated by equipment configured to render the three-dimensional representations and VR has been employed in gaming and for simulation and training purposes. These VR systems may allow users to interact in gaming environments to score points, advance in rank, or engage in simulations such as flight simulation, racecar driving, downhill skiing, or other activities.

SUMMARY

In an embodiment, a system for presenting and maintaining an interactive multi-user virtual space, comprising: a first device configured to communicate with a network and engaged with a first user and comprising a first video camera, a first microphone, a first stereo headphone, and a first binocular video monitor; a second device configured to communicate with the network and engaged with a second user and comprising a second video camera, a second microphone, a second stereo headphone, and a second binocular video monitor; a plurality of environment-monitoring components configured to communicate with the network and configured to obtain a plurality of information about an environment; and an application, is configured to communicate with the network, stored on a non-transitory medium and executable by a processor. The embodiment further comprising wherein the application: receives a first plurality of input from the first device; receives a second plurality of input from the second device; receives a plurality of environmental input from the plurality of environment-monitoring components; generates, based upon the first plurality of input, a first avatar; generates, based upon the second plurality of input, a second avatar; combines the first avatar, the second avatar, and the plurality of environmental input; and generates, in response to the combination, a virtual environment comprising the first avatar, the second avatar, and the plurality of environmental input, wherein the plurality of environmental input comprises a plurality of virtual elements including static elements and interactive elements. The embodiment further comprising wherein the application receives at least one action input from at least one of the first device, the second device, and the plurality of environment-monitoring components; and dynamically updates the virtual environment based on the at least one action input, enabling the first user and the second user to experience the dynamic update in real-time, and wherein the first binocular video monitor and the second binocular video monitor enable the first user and the second user to only view the virtual environment while engaged with the first and the second device.

In an alternate embodiment, a system for generating and maintaining a multi-user interactive virtual environment, comprising: a computer system on a network comprising a server, a data store, and a processor, wherein the data store comprises a plurality of user profiles and a plurality of stored environment information received from a plurality of environmental sensors associated with at least one environment and comprising a plurality of virtual elements; a first wearable electronic communication device in communication with the network and engaged with a first user and comprising a first video camera, a first microphone, a first stereo headphone, a first binocular video monitor, a first plurality of echolocation sensors, a first plurality of orientation sensors, and a first telecommunication interface; a second wearable electronic communication device in communication with the network and engaged with a second user and comprising a second video camera, a second microphone, a second stereo headphone, a second binocular video monitor, a second plurality of echolocation sensors, a second plurality of orientation sensors, and a second telecommunication interface; and an application stored in the server in a non-transitory memory and executable by the processor. The embodiment further comprising wherein the application: receives a request to initiate an interactive session, receives information from the first wearable electronic communication device and the second wearable electronic communication device via the first telecommunication interface and the second telecommunication interface; generates, based upon the information received from the first wearable electronic communication device and the second wearable electronic communication device, a first avatar associated with the first wearable device and a second avatar associated with the second wearable electronic communication device; combines the first avatar and the second avatar with at least some of the plurality of stored environment information associated with the at least one environment; and generates, based upon the combination, a first virtual environment comprising the first avatar, the second avatar, and the at least some of the plurality of stored environment information, wherein at least some of the plurality of virtual elements are interactive elements, to initiate the interactive session. The embodiment further comprising wherein the application presents, subsequent to generating, the virtual environment to the first user and the second user; receives, from at least one of the first wearable electronic communication device and the second wearable electronic communication device, an at least one action input, wherein the at least one action input comprises a motion input or a speech input; and updates, based on the at least one action input, at least one of the first avatar or the second avatar with at least one of an action associated with the motion input or an action and an audio indication associated with the speech input.

In an embodiment, a method for generating and maintaining a multi-user interactive virtual environment, comprising: receiving, by an application stored in a non-transitory memory of a computer system and executable by a processor, a request to initiate an interactive session, a plurality of inputs from a first wearable device, and a plurality of inputs from a second wearable device, wherein the first wearable device is engaged with a first user and comprises a first video camera, a first microphone, a first stereo headphone, and a first binocular video monitor, and wherein the second wearable device is engaged with a second user and comprises a second video camera, a second microphone, a second stereo headphone, and a second binocular video monitor; generating, by the application, based upon the pluralities of inputs received from the first wearable device and the second wearable device, a first avatar associated with the first wearable device and a second avatar associated with the second wearable device; and merging, by the application, the first and the second avatar with a plurality of environmental data stored on the data store to generate a virtual environment. The embodiment further comprising presenting, by the application, to the first user and the second user, the virtual environment; receiving, by the application, from at least one of the first wearable device and the second wearable device, an at least one action input, wherein the at least one action input comprises a motion input or a speech input; and dynamically updating, by the application, in real-time, and in response to the at least one action input, at least one of the first avatar or the second avatar with at least one of a motion associated with the motion input or a motion and an audio indication associated with the speech input.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The popularity of virtual reality (VR) systems over the past several decades has led to the evolution of VR systems as well as the uses for those systems. However, the VR experience challenges of conventional systems may include the lack of ability for users in a virtual environment to interact with each other as well as with objects within that environment in a manner that mirrors the real-life experience that a VR user would have in a person-to-person interaction, or while interacting with an object such as a document or a chair. Existing telecommunications applications may join remote parties together with either voice only-connections, and/or visually via monitors. The experiences may not simulate real-world conversations in which participants are located together in a shared space and can see, for example, facial expressions and share documents between the parties. Conventionally, in some cases, a low-bandwidth virtual reality conferencing system may involve overlaying an avatar on a static picture and presenting this representation on a flat monitor to another party involved in the conference. As used herein, an "avatar" is a three-dimensional graphic representation generated by the systems and methods discussed herein which is a rendering of a user engaged with a wearable device such as a wearable bodysuit, headset, or clothing such as gloves, socks, shoes, shirts, pants, etc., that may comprise embedded sensors or devices, or an exoskeleton (e.g., sensors/devices that may be worn with various types of a user's clothing). Avatars in a virtual environment as discussed according to embodiments of the present disclosure may interact with each other as well as with elements in the virtual environment, and their actions and interactions are presented to the users engaged with the wearable devices. In this example, even if the other party is presented in a different manner, the users of these systems may not be able to interact with each other nor with elements of the virtual environment, for example, sharing documents, using a common virtual whiteboard or modeling capabilities. A "virtual environment" may be a three-dimensional rendering of a location such as a conference room or other space in which users may interact. In an embodiment this rendering may be a video or other photographic representation of the virtual environment. The virtual environment may, in some embodiments, reflect the physical location of at least one user, and in other embodiments the virtual environment may reflect a location other than the physical location of at least one user.

In one example, this mobile mixed reality platform may enable a grandparent in France to have a conversation with their grandchild in Florida. This conversation may appear, to both the grandparent and the grandchild, to be taking place in the grandparent's living room in France, and the virtual environment may comprise the elements of that living room, tables, chairs, photographs, and home décor, which may have been captured by video equipment and sensors as discussed herein. The grandchild may be represented by an avatar and may be seated in a chair in the living room so that the grandparent can have a conversation with them, play checkers, chess, look at photo albums, use a virtual coloring book, or engage in other activities in the shared virtual spaced generated by the mobile mixed reality platform. This mixed reality enables participants to experience interaction in a shared virtual space where virtual objects can be shared, passed, and modified as real objects such as coloring books and chess boards would be used in the real world, and have the experience of interacting as they would in the real world if the grandchild visited the grandparent in France. As used herein, the term mixed reality refers to combination and/or mixing of virtual reality components or elements and what may be construed as 'real' reality components. Said in other words, mixed reality refers to a combination of digitally generated visual or graphical components or objects with images of objects captured by cameras.

In another example, if a student is enrolled in a remote learning experience, the student may join the teacher and/or other classmates in a virtual classroom or library space and may interact, discussing books, art, learning language together—all while using virtual books, art renderings, and whiteboards to engage in a shared virtual learning experience. This may enable an enhanced and enriched learning experience for students who may otherwise not be able to have a classroom experience or be able to work one-on-one with an instructor as they would be if the instructor was present in a real world classroom or one-on-one tutoring session.

In yet another example, if a personal shopper has clients unable to make an in-person appointment, the client and personal shopper can meet in a virtual environment such as a fitting room or dressing parlor. In this shared virtual space, a plurality of apparel and accessories may be loaded and reviewed by both the personal shopper and client. That is, the items may be rotated and otherwise manipulated including loading the items on to the (merging with) client's avatar. This process may simplify and expedite the personal shopping experience and make it a more approachable and more profitable business since the personal shoppers will be able to preview items to their clients prior to shipping or otherwise presenting the items to their clients in the real world.

As discussed herein with respect to the embodiments of systems and methods associated with the mobile mixed reality platform, interactive elements including a virtual whiteboard may function in a similar capacity to a whiteboard or blackboard in the real world, allowing multiple parties to map out ideas in a shared space, to view and modify the shared ideas, and to store those interactions for future review inside or outside of the virtual environment. An interactive element as discussed herein may be an element in a virtual environment that may be either purely virtual (created by, maintained, and stored in the mobile mixed reality platform) or quasi-interactive (elements which may be imported from a server outside of the mobile mixed reality platform), e.g., those elements that can be modified, edited, and stored by at least one user in the interactive session. A mobile mixed reality platform may be referred to as such because of the "mixing" (combination/merging) of users in different locations into a shared virtual environment during an interactive session.

Turning back to the challenges of conventional VR systems, conventional VR systems may have depth perception challenges where a rendering of a user is interrupted with other activity on the display, or with activity occurring outside of the display, for example through virtual reality glasses where a user sees the activity in their location through the glasses as well as whatever content is presented on the glasses. In another example, conventional methods of viewing avatars may not allow a first user in a virtual environment to interact with that environment in a realistic manner, e.g., if a first user in a first physical location reaches across a virtual shared space to hand a second user in a second, different, physical location, a document for review, this motion of handing the e-document to the second user may not correctly represent where the user(s) are located or the elements of the environment and can instead result in the appearance of a hand or an arm actually going through a desk, chair, or other element of the virtual environment. In an embodiment, the mixed reality environment may comprise a plurality of merged video images obtained by a plurality of sensors and video equipment as discussed herein. In an alternate embodiment, the mixed reality environment may comprise a plurality of video images merged with a plurality of virtual images.

In contrast, the systems and methods discussed herein provide a mobile mixed reality platform for wireless communications, where users in different locations are engaged with wearable devices and represented by avatars in a virtual environment and an immersive experience when using wearable technology. An immersive experience is an experience by the user where the user can only see what is occurring in the virtual environment during the interactive session and cannot see activity occurring in the user's physical location while the user is engaged with the wearable technology, for example, binocular video monitors. The avatars discussed herein may include renderings and/or video images of human beings, including not only the body and head of the represented human, but also the facial features and muscles mapped to those features in order to create an experience where the users view the speech and body movement of avatars within the virtual environment. A binocular video monitor may be part of the wearable device engaged by the users and presents an immersive experience where the user can only see the virtual environment and other avatars in that environment, and cannot see, for example, another person walking by when they are engaged with the wearable device. It is appreciated that the term "interactive session" may be used herein to describe the initiation, creation, and maintenance of the virtual environments and avatars discussed below.

In an embodiment, the parties engaged in an interactive session generated by the mobile mixed reality platform may be located in different rooms, buildings, states, or countries, and the platform allows the users to engage not only in discussion where it appears to the users that they are in a shared space, but the users may also participate in the creation, sharing, creation, modification, and approval of interactive elements and quasi-interactive elements. In an embodiment, a user in Paris, France and a user in Key West, Fla., United States, desire to engage in an interactive session to discuss architectural drawings. One of the users may initiate an interactive session and invite or otherwise establish access to the interactive session for the other user. In this embodiment, once engaged in the interactive session, each user experiences only the virtual environment and cannot see what else may be occurring in their location. A first user may import blueprints from a remote server, or may initiate a three-dimensional modeling space in which to generate, for example, a rendering of an arch, a staircase, or another architectural feature. In another example, the second user may desire to revise the imported blueprints and may do as such either on the blueprints or on a virtual whiteboard generated in the virtual environment. In either example, both users can see the blueprints, model, and whiteboard, and may have access to further modify and/or save any changes to the blueprints, the model, as well as any notations from the whiteboard.

Once an interactive session is initiated by a user or other administrator, that user and other users are immersed in a virtual environment generated by the mobile mixed reality platform for wireless communications. Users coupled to the wearable devices may have their speech and movement mimicked by their avatar in the virtual environment and may observe the avatars' associated with other users in real time, including leg movement, arm movement, torso movement, and facial movement/expressions. In one example, individual syllables are detected by at least one of the wearable devices discussed herein and parsed into mouth movements by at least one application. In another example, a first avatar associated with a first user in a first physical location (e.g., Paris, France) of a wearable device hands a second avatar associated with a second user in a second physical location (e.g., Key West), of a different wearable device an interactive element in the virtual environment, such as a virtual spreadsheet, does so in a manner in which the depth perception and movement of the transaction occurs as it would in real time, e.g., if the users were together in the same room.

That is, if the first avatar passes the virtual document, virtual model, or interactive element to the second avatar, for example, over a desk or conference table, both the first and the second users experience the object being passed from the first avatar to the second avatar in a virtual environment where they experience the avatars' respective hands are holding the object as it is passed, similarly to what would be seen in a real-world transaction, with the same depth perception and, in some embodiments, the same tactile sensation that they would have when passing an object in a real-world transaction. This is in contrast to the example above for conventional systems which results in the experience of an arm appearing to go through the desk or otherwise interact with the desk in a manner that does not reflect the users' experience in the corresponding real-time interaction, that is, the same way the users would experience the interaction if it occurred between parties in the same physical location (room). In another example, the real-time interaction may be quantified by a time lag between an action or interaction in a physical space and the corresponding action or interaction in the virtual environment. In one embodiment, the movement of a user in their physical location is reflected in the virtual environment with less than a two second lag, and in other embodiments the lag is less than 1-second. In still other embodiments, the lag is less than half of a second. In another example, if a user in Madrid, Spain desires to discuss a model for a widget with a party in Chicago, Ill., United States, the user in Spain may initiate an interactive session to include a three-dimensional modeling space and may import or generate a model of the widget which either the party in Madrid or the party in Chicago (or both) may be able to view, manipulate, modify, and save.

The experience of the users of the wearable devices may also be explained in that the system discussed herein is configured to incorporate the principle of occlusion. That is, the system can detect the relative position of avatars and environmental elements. The principle of occlusion is experienced by the users as a result of the use of physics engines, a 2D perspective builder, occlusion generation, collision detection, sound synthesizers. Occlusion calculation may include the position of static, interactive, and quasi-interactive elements relative to each user, so that, for example, elements that are closer to a user are seen by that user as occluding (i.e., blocking) more distant objects elements. Physics engines may encompass technology that may insure that virtual elements follow real world laws. For example, a virtual rubber ball would bounce naturally on a real floor or against a real (or virtual) wall. Collision detection would calculate and signal to users when users touch one another or other virtual objects. For example, while wearing gloves or a bodysuit configured according to embodiments of the present disclosure, the users may experience tactile sensations in their hands real-time when elements are touched or passed, as well as in other areas if they, for example, bump into a desk in the virtual environment.

The environmental elements may also be referred to as "virtual elements" or simply, "the elements," and may comprise static elements and interactive elements. Static elements may be those elements which exist in an environment but are either not interacted with by the users, and/or those which cannot be modified by the user, for example, a floor, a wall, or a picture frame, in addition to the examples in the embodiments below. Interactive elements may be those that are either purely virtual or quasi-virtual, e.g., those elements that can be modified, edited, and stored by at least one user in the interactive session. A virtual interactive element may comprise a virtual whiteboard, or a space for the generation, modification, and storing of three dimensional renderings. That is, a virtual interactive element is one that is created within the virtual environment by the mixed media mobile platform discussed herein which may, in some embodiments, be exported to a different computer system after it is created. A quasi-virtual interactive element may comprise a document, blueprint, or other electronic document that may be stored on a computer system that may be separate and distinct from the mixed mobile reality platform for wireless communications discussed herein, and loaded into the system as described herein and then subsequently modified/stored/copied etc. The virtual and quasi-virtual elements may be collectively referred to as "interactive elements."

The mobile mixed reality platform and methods of use therein join remote participants together, via wireless networks, in a more natural setting. This mobile mixed reality platform addresses various aspects and challenges of conventional VR and shared conferencing/meeting/training/gaming systems by addressing technological solutions to challenges of conventional systems including but not limited to depth perception, occlusion, user immersion, and avatar functionality in order to yield the result of a shared interactive session where avatars can interact with each other, with the environment, with virtual elements created in and for the virtual environment, as well as with quasi-virtual elements loaded into the virtual environment. This more natural setting generated using the mobile mixed reality platform, which may be referred to as a "virtual environment" or a "three dimensional virtual environment," may be perceived by participants in the environment as a real, shared, work, training, and/or social space. The virtual environment may be generated in response to a request from at least one user to initiate what may be referred to here as an interactive session. The participants, which may be described as users, users of wearable devices, or as users associated with avatars, can interact with the one another, the shared spaces, and virtual elements, which may be interactive or static elements, in ways that both replicate and extend natural human interactions. It is appreciated that, when interaction between participants in the virtual environment is described, it is the action of the participants' avatars.

The systems and methods discussed herein may allow multiple users to interact in a virtual environment that is modeled after at least one of the environments in which a user currently resides or an environment specified by at least one user, for example, the user who initiates the interactive session. In alternate embodiments, previously rendered and stored environments may be loaded for the users to interact within. In an embodiment, at least two users are wearing or otherwise engaged with devices that may comprise a headset and/or a bodysuit, these devices may be configured to communicate with an application on a network which receives information regarding the user, such as the user's relative position (sitting, standing) and speech and generate a three dimensional rendering in the virtual environment. This wearable technology not only tracks the users body movements but is specifically configured to track movements of a user's mouth and translate that movement to the three dimensional rendering of the user so that others in the virtual environment can not only hear what the user is saying but can see the movement of the user's avatar.

In an embodiment, the systems and method discussed herein may enable (a) a plurality of individuals to interact in a virtual conference room, (b) interaction of those individuals with editable (interactive) and non-editable (static) elements, for example, the sharing, review, and discussion of documents within the virtual conference room or other environment may be possible, but another scenario is that a virtual whiteboard or other editable object may be present in the environment which at least some of the plurality of users may be able to interact with and have those interactions seen by the users in the environment, and (c) generation of elements by users within the virtual environment, for example, the generation of a building structure or mating features of various components. The virtual environment discussed herein may be thought of in various embodiments as a traditional conference room where people gather to generate and share knowledge, as well as a generally interactive environment that could be used for training purposes, gaming, simulations, and customer care purposes, e.g., interaction between users and customer care representatives. The mixed reality environment may be captured by a plurality of video equipment and other sensors and may be a video representation of the actual elements of the room, in contrast to a graphic or cartoon-ish rendering of the elements. It is appreciated that a mix of representations of actual and virtual elements may be present in some embodiments as discussed herein.

In an embodiment, the environment rendered and merged with the avatars as discussed herein may be based upon a plurality of stored information about an environment associated with a user. A user may have a profile that comprises a plurality of bibliographic information and a plurality of stored environments, for example, an office and a conference room. A stored environment may be a three-dimensional model of environment previously mapped by the system discussed herein that may be a location commonly used for interactive sessions. This stored environment may be viewed, for example, during an interactive session, using binocular video monitors and may appear to the users to be three dimensional. The stored environment(s) may be updated when loaded to reflect changes/additions to the virtual environment since the last use of the stored environment. In an alternate embodiment, the environment rendered by the application as discussed herein may be a composite environment, comprising an environment associated with a first user profile and an environment associated with a second user profile that may be divided along a specified plane within the virtual environment. In this embodiment, the first user would see the second user in the environment associated with the second user, and the second user would see the first user in the environment associated with the first user. In any of these embodiments, either when the environmental data used to generate the rendering is initially gathered and stored or when the environmental data is gathered in real-time when the application is executed, a user may designate elements in the environment as static or interactive elements.

The system discussed herein may comprise (1) user-local elements, (2) centralized elements, and (3) network elements. In an embodiment, the user-local elements may comprise a headset, a data suit and/or exoskeleton, as well as a user's locations and orientation targets. In an embodiment, the headset may comprise a plurality of video cameras, a plurality of microphones, a high resolution display, stereo headphones, a plurality of echolocation beacons, a plurality of orientation sensors, and a plurality of telecom interfaces. The data suit, which may also be referred to as an exoskeleton, may comprise sensors including accelerometers which capture the position of the user's trunk, limbs, and digits, as well as specific control gestures (e.g., gesture to pick up an object, gesture to write with virtual pen). Positional information may also be provided by the data suit and/or headset, both the relative position of a user's body in relation to a normal position as well as the position of a user with respect to elements of a virtual environment.

This positional and gestural information may be transmitted from the wearable device to an application through a network, which is associated with at least one computer system comprising a plurality of servers, applications, and data stores that are specifically configured to communicate with each other, with remote devices, with the network, as well as with a plurality of other computer systems that may be used to monitor environments and/or users. In an embodiment, the users' locations and orientation targets may comprise the environment from which a user is engaging in the interactive session. The users may be located in structures, such as rooms or outdoor 3D and 2D structures, which are initially measured and recorded in a 3D engine. These may be referred to as "known" or "stored" structures or environments and, in some embodiments, a default structure or environment may be set by a user and associated with the user's profile. These structures are the context within which user interactions occur in the virtual environment and may also serve as landmarks and reference points with which a user's sensors on the user-local elements may continuously record. In an embodiment, orientation analyzers coupled to wearable devices are configured to continuously update the user's location and orientation with respect to the environment as well as the relative position of the user's other limbs, torso, etc. These components are described in detail below.

In an embodiment, the centralized elements may comprise elements configured to receive data such as an orientation analyzer and an articulatory gesture decoder, and a 3D rendering engine. The orientation analyzer may combine information arriving from each user's terminal (headset, body suit, etc.) equipment, and with other information, such as past behavior (movement, articulation), to form a continuously updated estimate of where a user is located, and how they are oriented within their local space. The orientation analyzer may comprise smoothing and predictive algorithms that improve the quality of estimates. Outputs from the wearable device(s) drive the location of virtual camera/user's eye location in the 3D engine. The articulatory gesture decoder may analyze recorded speech of each user and the phonetic content may be extracted and translated into a series of articulatory gestures which are fed into the 3D engine so that a first user can see a second user's mouth, hands, fingers, arms, etc. movement as the second user speaks and makes gestures. The 3D engine, which may also be referred to as a "3D rendering engine" or a "rendering engine" may be employed to generate three dimensional representation of real spaces occupied by participants (users), as well as three dimensional representations of the participants themselves and a variety of virtual elements. These three dimensional representations may comprise video images captured by the discussed video equipment and sensors. Via geometric and other physical knowledge, the 3D engine is able to join the participants from different physical locations in interactions, in ways that create cognitively plausible events of a "normal" reality, and, at the same time, can create completely unexpected and valuable extensions of that reality. A third engine may be employed to combine/mix three dimensional renderings of users (avatars) with a plurality of environmental data from stored and real-time data. As used herein, the term "virtual environment" may refer not only to the environment itself, but also to the combination of avatars with environmental data to generate not only the space but the actors within the space.

In an embodiment, the plurality of network elements discussed herein may comprise elements configured to convey information from the plurality of users via, for example, a wireless network to the plurality of centralized elements.

The plurality of network elements may flow not only be configured to transmit information from the plurality of centralized elements to the plurality of users, but also from the plurality of users to the plurality of centralized elements. The configuration of, and interaction between, the (1) user-local elements, (2) centralized elements, and (3) network elements may create an experience for individual users of the plurality of users so that, for example, they are able to engage in a new type of "telephone call" or conference bridge. One aspect of this system is that the user experience is that participants are naturally conversing, complete with related hand and vocal gestures, in a common, real physical space. Users are able to move around and interact with one another, and around other objects in the common space which the user may also be able to interact with, just as they would if they were actually in a common space. Further, users would sense when they are occupying the same space, such as when they, e.g., shake hands, or when they touch a virtual object. Finally, given gestural controls, users would be able to manipulate virtual objects, such as, e.g., drawing figures in the (shared space), rotating business graphs or models, etc.

Figure 1:
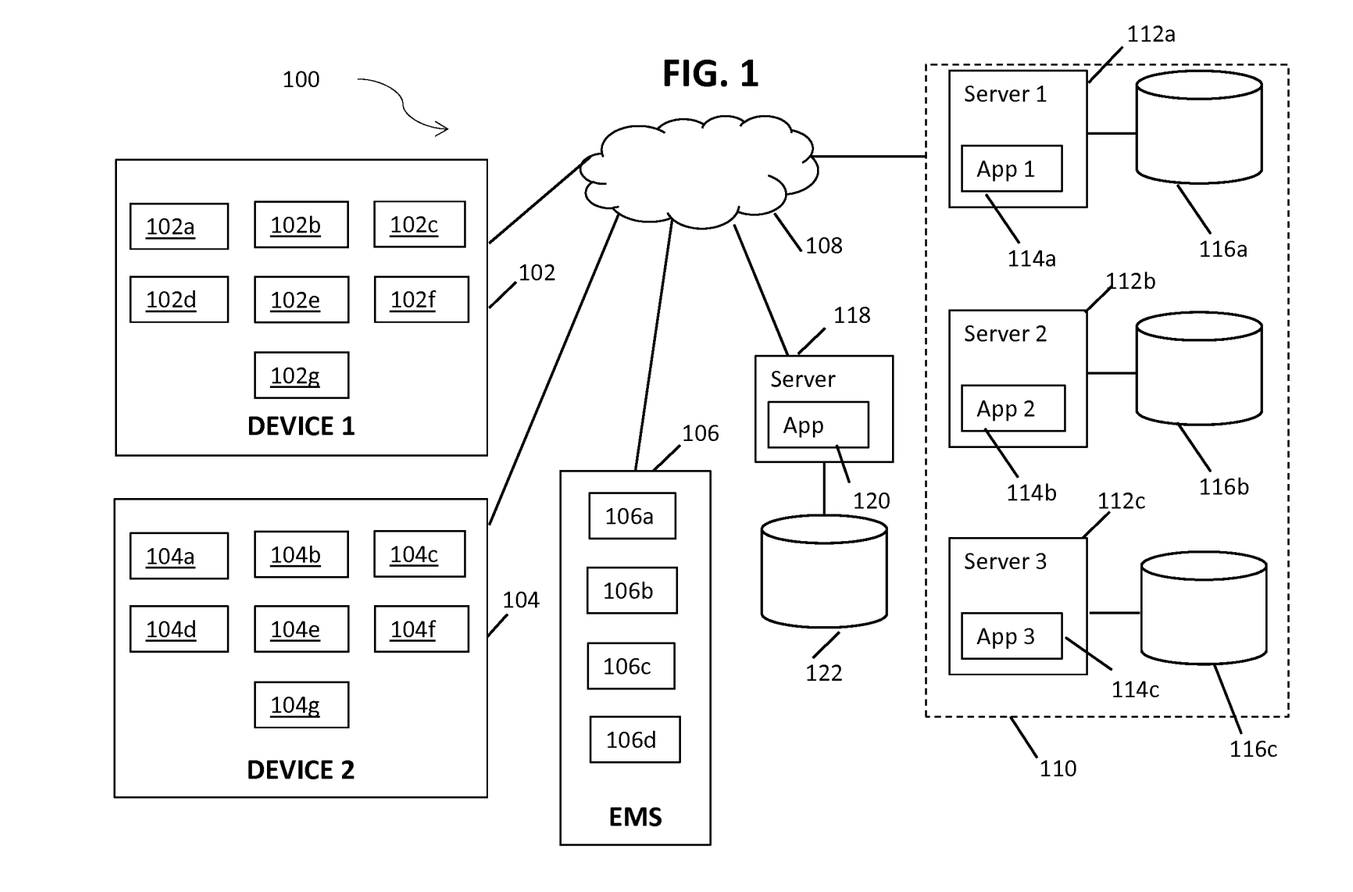
FIG. 1 is a mobile mixed reality platform for wireless communications according to embodiments of the present disclosure.

FIG. 1 is a system 100 according to embodiments of the present disclosure to generate and dynamically update a virtual environment. The system 100 may be referred to as a mobile mixed reality platform 100 and may comprise a first device 102, a second device 104, at least one environmental monitoring system (EMS) 106, and a computer system 110. In an embodiment, the first device 102 and the second device 104 (which may be referred to herein as "devices 102 and 104") may be wearable technology which may each comprise all or any combination of a camera (102a, 104a), a microphone (102b, 104b), stereo headphones (102c, 104c), a binocular video monitor (102d, 104d), a plurality of echolocation sensors (102e, 104e), a plurality of orientation sensors (102f, 104f), and a telecommunications interface (102g, 104g). The virtual reality experience provided to the wearers of the devices 102 and 104 may comprise the ability to interact with each other, with additional users, and with the environment generated/rendered and maintained by the computer system 110.

In an embodiment, the computer system 110 may comprise at least one application (114a, 114b, 114c) on at least one server (112a, 112b, 112c). The devices 102 and 104 are in communication, for example, by way of the telecommunications interfaces 102g and 104g, with the server 112a which may be referred to as the analysis server 112a. The pluralities of information gathered by the devices 102 and 104 may be transmitted to the analysis server 112a not only upon a user engaging with the device 102 or 104, but also for the duration of the engagement of the user with the device 102 or 104, as discussed in detail below. In an embodiment, an interactive session may be initiated by either of the devices 102 or 104 or by an administrator, for example, at a predetermined time or along a predetermined schedule of interactive sessions.

In an embodiment, users engaged with the devices 102 or 104 may be able to restrict feedback from one or all components of the devices 102 or 104. In some embodiments, this ability may be tied to the rights and permissions associated with the user profile of the user who initiated the interactive session. In alternate embodiments, this ability may be retained by each user. This may be desirable, for example, if a user wishes to passively participate (e.g., listen in, or listen in and view other avatars but not interact) during a first portion of a call and then interactively participate during a second portion of a call, and may not want their motion and speech patterns dynamically detected during the first portion of the call.

In an embodiment, each of the first device 102 and the second device 104 (which may be collectively referred to as "the devices 102 and 104") may also comprise accelerometers and other sensors and devices not pictured here but specifically configured to capture the position of a user's trunk, limbs, and digits, as well as specific control gestures, for example, gestures associated with virtual (static and interactive) elements from the virtual environment. In an embodiment, the devices 102 and 104 may comprise a plurality of separate devices housing the various components discussed above, such as a headset and a data suit/exoskeleton. In an alternate embodiment, the devices 102 and 104 may be single devices with the headset features and body suit/exoskeleton features combined into a single apparatus. In another alternate embodiment, the devices 102 and 104 may comprise a plurality of individual, wearable, parts, some or all of which may be used/work to detect upper body movement, head/neck movement, lower body movement, and combinations thereof. In addition, some components of the devices 102 and 104, or other devices associated with other users who may be participants in a virtual environment, may be controlled by an administrator. For example, if a virtual meeting is a training meeting, the leader/trainer may not want the other participants to be able to interrupt during their presentation. Therefore, the leader/trainer may turn off/disable the components that monitor, map, and mirror speech patterns and/or body movements and gestures until, for example, a Q&A or other interactive part of the training. In some embodiments, an administrator or other authorized party may be able to designate certain items in a virtual environment as static or interactive, may be authorized to load quasi-interactive elements. In addition, an administrator may also be able to establish shared interactive spaces, which may be referred to as collaborative virtual spaces, such as a virtual whiteboard or modeling space which may be used to generate three-dimensional models that may be shared/modified/edited by at least some users in the interactive session depending upon the permissions associated with those users' profiles.

In an embodiment, the server 118 which may comprise an application 120 and a data store 122, may be specifically configured to communicate with a network 108 and the computer system 110 in order to provide information stored in the data store 122 to the interactive session. The network 108 may comprise a telecommunication service provider's network capable of maintaining the mixed mobile reality platform discussed herein. That may include supporting communication between multiple wearable devices, at least 102 and 104 and the computer system 110 as well as the server 118 three-dimensional renderings and updates. This information in data store 122 may be generated using application 120 or other applications not pictured here, stored, and have permissions for access, modification, storage, and other functionalities set upon its creation or at various points in the life of the information, e.g., spreadsheets, presentations, proposals, blueprints, and other information capable of being stored electronically. These permissions, as discussed herein, may be associated with a user profile.

In one example, a chair may be designated as either a static or an interactive element, depending upon the embodiment. If there are two avatars in a virtual environment, each associated with one of devices 102 and 104, in a virtual environment comprising a conference room with 12 chairs, some chairs may have been previously designated by a system user or administrator as interactive and some as static. This previous designation may be stored on the computer system 110. It is appreciated that the user of the first device 102 may view the avatar associated with the user of the second device 104, and may also see for example their own hands/arms/etc. when shaking hands with or passing virtual elements to the avatar associated with the user of the second device 104. In another embodiment, each user of devices 102 and 104 may be given the option to designate one chair (per user) as interactive. The ability (rights and permissions) to establish an element as interactive, or to change a static element to an interactive element and vice versa, may be associated either with the presence of a user's avatar in an environment and/or whether the user was previously associated with the environment. That is, a user associated with the first device 102 may have the rights and permissions to designate a chair as interactive in any environment that was previously or is currently associated with the user of the first device 102, based upon the user profile associated with the user of the first device 102. In an alternate embodiment, a previously stored environment rendered based upon data collected by EMS 106 may be configured as to allow an administrator, a single user, a group of users, or any user in the interactive session established using that previously stored environment to designate virtual elements as static or interactive and to interact with the interactive elements.

In some embodiments, the user of the first device 102 may also be enabled to give the ability (rights and permissions) to some or all other users in a virtual environment to designate a predetermined number or type of elements as interactive or static, or to designate elements as interactive or static over a predetermined period of time. The ability (rights and permissions) to load and/or modify a quasi-interactive element that has been loaded into the virtual environment from another system or program stored on a system that may be separate and distinct from the system 100. These quasi-interactive elements may comprise a text document, a slide or multimedia presentation, spreadsheets, video, project timelines, blueprints, and other three-dimensional models, renderings, or combinations thereof.

In an embodiment, the environmental monitoring system (EMS) 106 may have been previously used to map at least one environment using a plurality of components, which may include video cameras 106a, motion sensors 106b, acoustic sensors 106c, and a plurality of additional components 106d employed to gather data to generate three dimensional renderings of internal structures such as offices and conference rooms. In an embodiment, the EMS 106 may have been previously configured to collect and send data to, for example, the analysis application 114a about a plurality of static elements such as desks, bookshelves, walls, filing cabinets, and other office equipment and décor. In an alternate embodiment, the environment monitored by EMS 106 may also comprise a plurality of selectable or interactive elements as well as quasi-interactive elements as discussed herein.

In an embodiment, the analysis server 112a may comprise an analysis application 114a and a data store 116a. The analysis application may receive a plurality of data from the first device 102, the second device 104, and the EMS 106 from the plurality of monitoring components (102a-102g; 104a-104g, 106a-106d) associated with each of the devices 102 and 104 and the EMS 106. While in this embodiment the generation of a virtual environment is discussed with respect to the monitoring of a single environment by EMS 106, in alternate embodiments, multiple environments may be monitored and the user spaces may be combined in various ways, for example, with a user in each separate environment designating a false wall in their room which establishes a border for a common, shared space. In an embodiment, the second server 112b may comprise a rendering application 114b and a data store 116b and may be referred to as a modeling and rendering server 112b that may receive a plurality of information from the devices 102, 104, and the EMS 106. In an embodiment, the users wearing the devices 102 and 104 are located in known structures, such as rooms or outdoor 3D and 2D structures, which are initially measured, for example, by the EMS 106 and stored in at least one of the servers 112a, 112b, or 112c. These known, stored, structures may be the context within which user interactions occur, and also serve as landmarks and reference points with which a user's sensors (on the devices 102, 104) continuously record, and with which orientation analyzers use to continuously update estimates of the user's location and orientation. The dynamic, real-time updating of the virtual environment generated according to embodiments of the present disclosure is discussed below in detail.

In an embodiment, the third server 112c may comprise an image mixing application 114c and a data store 116c and may be referred to as the image mixing server and may combine representations (avatars) of the users associated with devices 102 and 104, with previously stored information and/or information gathered by the EMS 106 in response to a request to initiate an interactive session in order to generate a virtual environment where the avatars may interact with each other and with at least some elements in the virtual environment during the interactive session. It is appreciated that as the actions of the servers 112a, 112b, and 112c, are discussed herein, these may be functions executed in whole or in part by the applications 114a, 114b, and 114c, respectively associated with each of the servers 112a, 112b, and 112c.

In an embodiment, the environmental rendering of the environment generated by the second server 112b may be from real-time data gathered by the EMS 106 when an interactive session is initiated. In an alternate embodiment, the environmental rendering generated by the second server 112b may be from stored data from at least one of the data stores 116a, 116b, and 116c. In yet another embodiment, the environmental rendering generated by the second server 112b may be from a combination of stored data and real-time data. In any embodiment, the environmental rendering generated by the second server 112b may comprise a plurality of interactive and static elements that may be designated as such either manually or by virtue of the type of component employed to gather data about the element. Static elements may be elements that are not moved or interacted with when the avatars are in the virtual environment. In one example, a plurality of static elements associated with the environment may comprise a conference table, at least two walls, windows, a plurality of office furniture comprising at least a desk, a chair, a conference table, and filing cabinets. In some embodiments, an element such as a chair may be either static or interactive. In another embodiment, virtual elements and spaces such as a virtual whiteboard that allows multiple parties to generate, add, delete, and modify information in a shared space or a three-dimensional modeling space configured to enable at least one of the avatars to generate, modify, delete, and otherwise manipulate three-dimensional models. For example, users in a virtual environment who want to work on calculations together may share a virtual whiteboard to work on the calculations in a simultaneous or overlapping fashion.

In another example, a user, who may be the user who initiated the interactive session, may use the analysis application 114a to designate a three-dimensional modeling space within the virtual environment where models generated by external programs may be loaded, manipulated, and saved in various electronic formats. In some embodiments, the three dimensional modeling space may be employed to generate a new model, i.e., a model to be used to build an architectural structure, a functional component, or an aesthetically pleasing component that is generated in the space and not loaded from a previous interactive session or loaded from an outside program. In any of these examples, some or all of the users in the interactive environment may have the rights and permissions to interact with a three dimensional model, such as the ability to generate, modify, accept changes, reject changes, and save/store the model. In an embodiment, for example, at block 224 as discussed below with respect to FIG. 2, the virtual whiteboard and/or three-dimensional model may be saved at predetermined intervals on a dynamic basis to avoid losing work in the event of an interruption to or disconnection from the system by one or more users. In some embodiments, the virtual whiteboard or three-dimensional model may be exported by way of the network 108 to a server on or outside of the computer system 110.

The devices 102 and 104 may be headsets, data suits/exoskeletons, or combinations thereof. In an embodiment, the cameras 102a and 104a may comprise a plurality of video cameras which may record the user's binocular view and which may also be configured to support user localization (location within an environment) and orientation (direction the wearer's head, body, etc. are positioned). The microphones 102b and 104b may comprise a plurality of microphones which are configured to record sound for each of the wearer's ears and to record the wearer's voice as well as to record sound(s) associated with a user's location and orientation so that, for example, a first wearer would hear speech from a second wearer differently if the first wearer was in front of them in the virtual environment as compared to if the user was behind them—i.e., to reflect the difference in what the first wearer would experience in a real environment based upon the relative position of a second party to the first wearer.

The binocular video monitors 102d, 104d, may be full color, wide angle, high resolution, short latency displays which are close to the user's eyes, like a pair of lenses in a pair of spectacles, and may be configured to create an immersive experience, wherein the wearers of devices 102 and 104 do not see the virtual environment overlaid with their actual environment, but rather only see a 360-degree view of the virtual environment (generated as discussed below). That is, a user engaged with the device 102 comprising the first binocular video monitor 102d, will see the virtual environment, but will not see, for example, through the first binocular video monitor 102d if another party walks past them, if a bird flies past them, or if other activities occurs while the user is engaged with the first binocular video monitor 102d. Rather, video cameras 102a and 104a on the headset record the local environment and the system merges that information into the virtual environment to form a mixed reality image presented in the binocular video monitor, that is, the local reality of a user is merged with the virtual reality of the interactive session. In alternate embodiments, media-enabled glasses or other eyewear may be employed instead of a binocular video monitor or as an alternative to a binocular video monitor, and parties engaged in a shared virtual space may wear a mix of these options. In those embodiments, the wearer may not only see the mixed reality environment and/or virtual environment but may also be aware of activity in their real-world location, and may be able to see people walk past, cars drive by, and other activity even when engaged with the media-enabled eyewear.

In an embodiment, the binocular video monitors 102d, 104d may be configured to provide mixed video feeds from the video cameras 102a and 104a. The stereo headphones 102c, 104c, may present acoustic signals comprising acoustics from the environment of the wearer of the devices 102, 104, as well as those generated by other user's (i.e., not the device wearer) voices and by the plurality of virtual elements within the virtual environment. The pluralities of echolocation beacons 102e, 104e, may be configured to create a series of acoustic signals which radiate outward from the user, reflect off environmental objects, and are captured by the user's microphones. The pluralities of orientation sensors 102f, 104f, may comprise a full complement of accelerometers and magnetometers which are configured to measure a device wearer's location in space, and the orientation of the device wearer's head. The telecommunications interfaces 102g and 104g may comprise connections to wireless networks which convey all information collected from the user, and all data that is conveyed back to the user. These interfaces 102g and 104g also communicate with other user-based equipment as well as the computer system 110.

In an embodiment, the environmental rendering generated by the second server 112b and combined by the third server 112c are combined with renderings of the avatars and transmitted back to the devices 102 and 104 along with signals indicating at least the virtual elements in the combined virtual environment, which may simply be referred to as "the virtual environment." The users engaged with the devices 102 and 104 are provided with an interactive, immersive experience where each device 102 and 104 provides access to a virtual environment in which the user can interact with and view their interaction and the other users' interaction with the environment and with other avatars. For example, a user's interaction with a virtual document or a whiteboard can be experienced by all users in the environment, and a user who is seen to sit down in their physical location also sits down, for example, in a chair in the virtual environment. In contrast, in some conventional virtual reality systems, a user may reach over a virtual desk only to have it appear to the user that their hand or arm is going through the element. However, using the system 100, the users in the virtual environment that is generated according to embodiments of the present disclosure will experience depth perception that mirrors the depth perception the users have in real time, in real life.

The immersive experience of each wearer of the devices 102 and 104 in a virtual environment may include the ability to interact with at least some virtual elements in the virtual environment, and to experience the virtual environment with the same depth perception and real time movement as they would in a person-to-person interaction. The data based upon which the virtual environment is generated may be obtained when the plurality of components (106a-106d) in the environmental monitoring system 106 are in communication, for example, by way of a telecommunications platform 106d with the at least one application (114a, 114b, 114c). The analysis application 114a may receive a plurality of data from the EMS 106, and the application 114b may be a three dimensional rendering engine that generates the virtual environment. In an embodiment, the application 114c may be the image mixing application 114c that combines the avatars generated as discussed herein with the rendering based on the plurality of data from the EMS 106 to generate the virtual environment comprising the avatars and initiate and dynamically update the interactive session.

The application's (114, 114b, or 114c) processing of the relative position of elements in a virtual environment may be thought of as the generation and dynamic updating of a depth-map, where if a first avatar puts their hand in front of a chair in the virtual environment, their hand appears in front of the chair (interlocutor) and not behind it, above it, through it, etc. Another aspect of the device-wearing users is the experience of viewing another user's avatar's facial features including eyebrow, cheek, eye, and lip movement when the user associated with that avatar is speaking. The mouth movement of the avatars in the virtual environment mirrors speech in the real world by breaking speech down into phonemes and mapping phonemes to the articulatory gestures needed to make them. If one could acoustically recognize "ball," the sound is mapped to a known phoneme, pulled from a data store comprising a plurality of dynamically updated phonemes, and the phoneme can be mapped on to the muscular pattern of the avatar's face/mouth to program that face/mouth to mirror the motion of the user's face/mouth in real time.

While various functionalities are discussed above with respect to the servers 112a, 112b, 112c, and the associated applications 114a, 114b, and 114c, the computer system 110 may be configured in various embodiments to support these and other functionalities, and may be configured so that the functions of the applications 114a, 114b, and 114c, may be separate, overlapping, or may be shared functionality depending upon the load on each server 112a, 112b, 112c. The computer system 110 discussed herein may be able to process and detect additional information from at least one of the devices 102, 104, or the EMS 106. For example, the computer system 110 may be configured to generate a rendering of a plurality of local spaces in a monitored environment, including relevant objects (interactive and static elements), landmarks, and reference structures such as walls, windows, doors, etc. With proper sensors, changes in the state of the space are tracked and changed (updated) as the state of the space is changed. These changes may include the turning on and off of specific light sources, door openings and closings, movement of other inanimate and animate objects, and may utilize the system capabilities in various ways. In one example, as lights are turned on and off, the shading and coloring of virtual objects could be modified accordingly, to enhance their appearance of being part of the real space. In another example, this functionality may be used to filter out background noise if a speaker is located in a noisy environment.

In an embodiment, the computer system 110 is configured to generate a representation of combined user space (in the event that user's spaces are not the same shape and size), and objects (e.g., doors, windows, furniture). This would include a union, or area that is common to all users' spaces (shared desk/conference table), as well as those areas that are not common to all spaces (shelves, file storage, chair design, window and door location, etc.).

In an embodiment, representation of all users wearing the devices 102, 104, or other devices with similar capabilities (e.g., if more than 2 users participate in an interactive session), including the users' location, the users' orientation, the orientation and movement of users' body parts, and their appearance. Note that the appearance of avatars can be high fidelity replicas of the people they represent, or could, if so desired, have a completely different appearance with respect to body type, hair color, eye color, and other features.

Representations of actual users are determined by sensor data from the devices (e.g., 102, 104) associated with and engaged by those users, including their articulatory gestures, which are driven by an Articulatory Gesture Decoder. This decoder takes as its input spoken language, and determines the articulatory gestures employed to create them, as discussed above with respect to phonemes. This information controls the visual appearance of an avatar's mouth, lips, jaw, tongue, etc., so that these facial features of the associated avatar appear to users in the virtual environment to match the sound that is heard by the speaking user represented by the avatar.

The computer system 110 may also be configured as discussed above to detect or generate, accept modifications to, reject modifications to, and store representations of virtual elements, which could include modifications to objects in the physical environments. Virtual elements may be static or interactive elements as defined above, a user could trigger the generation/rendering of a door or a window where there may not be one in the environment in which the user is located which would be a static element. The user could also generate a whiteboard or designate a three dimensional modeling space as discussed herein, and in some embodiments, the virtual environments may include computer controlled avatars, for which there is no remote, human counterpart. These avatars may be employed, for example, if a document or model is loaded into the computer system to appear in a virtual environment and, instead of the object just appearing in a space or in an avatar's hand, it may be "delivered" by an avatar with no human counterpart, i.e., a virtual assistant.

The systems and methods discussed herein may be employed for a plurality of applications, since mixed reality effectively creates a new medium for expression and communication, and, as such, its applications and impacts are myriad and diverse. As discussed above, the systems and methods discussed herein may be employed to establish a telephone call or conference bridge, e.g., rather than traditional bridges where either voices are heard, or participants view one another on a monitor, participants in a virtual environment generated/supported by the mobile mixed reality platform could interact in more natural manner, and could present data or demonstrations in a more compelling manner. The platform could be used for business, educational or completely personal purposes, such as book clubs, watch parties, etc. There may also be implications for beta-testing or otherwise validating software in a shared environment, as well as uses in disciplines such as sales, customer care, gaming, geographical/architectural exploration, training/education, art, interactive movies, and robotics. In the area of sales, real or computer controlled avatars can sell products and services, either for a telecommunications service provider or any other arbitrary product set. The immersive nature of the medium would make it a more effective channel than other remote channels for customers to review and compare products. With respect to customer care, mixed reality provides an enhanced means to explain product features or functionality, or troubleshooting, in a very media-rich environment. Gamers may be able to employ mobile mixed reality where remote users interact with one another in a common space which also contains computer controlled avatars and elements, and trainers and other educators may use the platform to provide realistic training, particularly that which would involve a real environment including military training, first responder training, and other training.

In some embodiments, the systems and methods discussed herein may be employed for geographical/architectural exploration. For example, the platform may be used for overlaying real historical sites, as they currently are, with virtual historical models of structures, people, and events. Further, users could move through these displays and interact with those virtual elements, and could also do so with respect to art galleries and installations as well as interactive movies, television shows, and other interactive media by providing a medium in which users can interact with virtual elements which are integrated with a real environment. In addition, users in the field of robotics may desire to employ the 3D modeling, orientation, and related functionality to robotics. The systems and methods discussed herein provide a memory and representation of the space in which an autonomous device is located, and it can be quite useful in terms of acting as a memory for all objects in the present room, for example, and other adjoining rooms (e.g., medicine is in cabinet in bathroom), and as a representation of individuals, even those that cannot be currently seen or sensed. Further, with additional algorithms and logic, the model can be used to generate plan and evaluate plans and projections, such as determining a locomotive path or the optimal path of a projectile (e.g., a pitch or a soccer kick).

Figure 2:
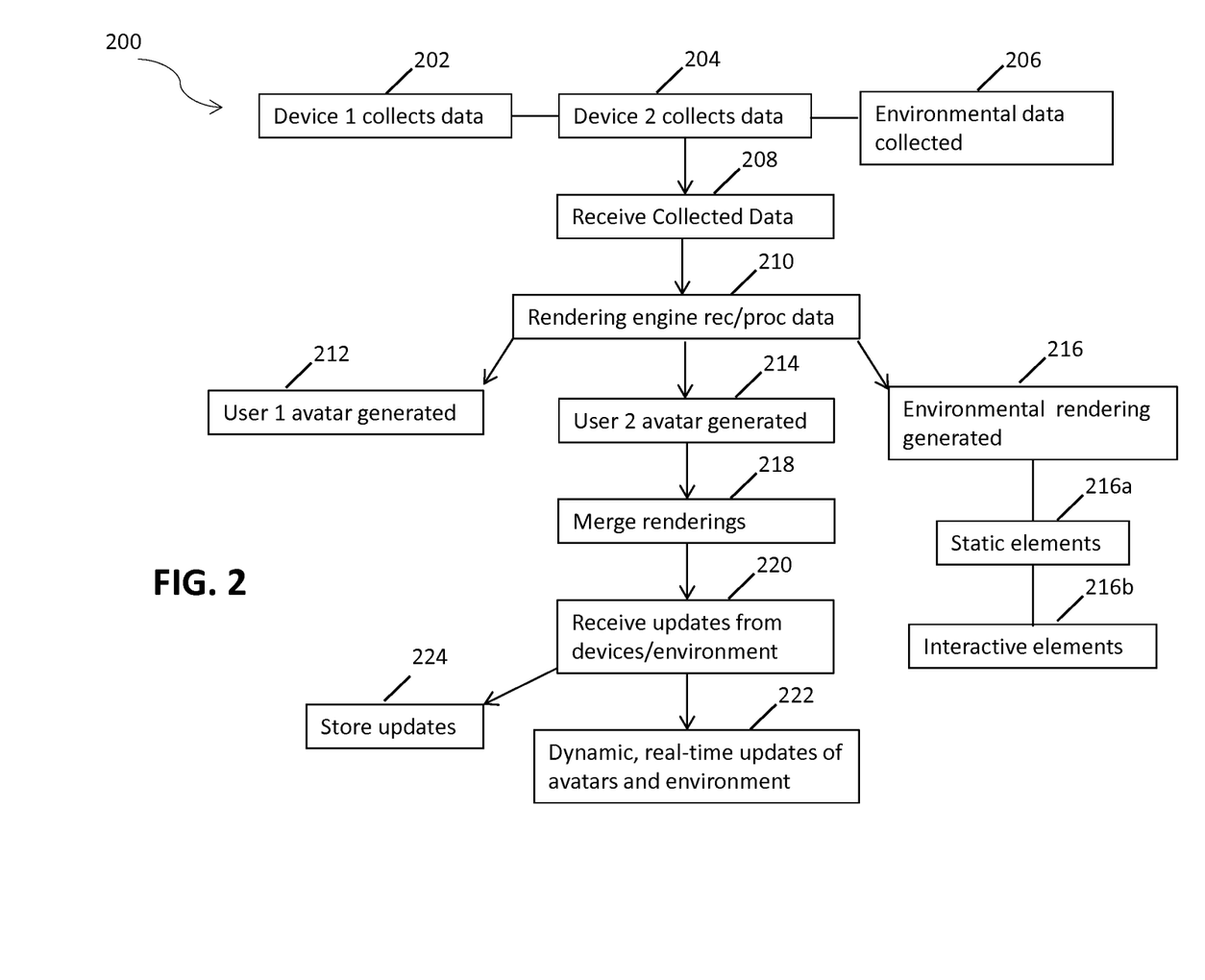
FIG. 2 is a flow chart of a method of generating and maintaining a three-dimensional virtual environment according to embodiments of the present disclosure.

FIG. 2 is a flow chart of a method 200 of generating and maintaining a three-dimensional rendering according to embodiments of the present disclosure. The method 200 is an example of how an interactive session is initiated and maintained. In the method 200, at block 202, a first device such as the first device 102 in FIG. 1 collects data. The first plurality of data collected by the first device 102 may comprise information about the size, shape, and relative position collected by the plurality of components discussed above with respect to FIG. 1. Additionally in the method 200, at block 204, a second device such as the second device 104 in FIG. 1 collects data. The second plurality of data collected by the second device 104 may comprise information about the location, orientation, size, shape, and movement of the second user collected by the plurality of components associated with the second device 104, discussed above with respect to FIG. 1. At block 206, a plurality of environmental data may be collected, for example, by the EMS 106 from FIG. 1. In an embodiment, the environmental data collection at block 206 occurs concurrently with the data collection by at least one of the first device 102 at block 202 and the second device 104 at block 204. In an alternate embodiment, the environmental data collection at block 206 may occur prior to the data collection at least at blocks 202 and/or 204 and the data collected at block 206 may be stored as discussed in FIG. 1 with respect to the data stores 116a, 116b, and 116c and retrieved as a part of the method 200, for example, as a part of block 208.

At block 208, the data collected at blocks 202, 204, and 206 are received by an application that may be similar to the analysis app 114a discussed above in FIG. 1. In an embodiment, the plurality of data collected by the EMS 106 at block 206 may be received at block 208 and/or may be retrieved at block 208 depending upon whether the data, as discussed above, is being collected real-time/at the same time as the data collected at blocks 202 and 204 or whether the data collected at block 206 was previously collected and stored on the data stores 116a, 116b, and 116c as discussed in FIG. 1. The data received and/or retrieved at block 208 by the analysis server 112a may be sent to the modeling and rendering server 112b at block 210. The modeling and rendering server 112b may generate an avatar for a first user at block 212, and the first user's avatar may be associated with and linked to the first device 102 and the activities including speech, movement, and interaction with the environment and other avatars. At block 214, the modeling and rendering server 112b may generate an avatar for a second user, and the second user's avatar may be associated with and linked to the second device 104 and the activities including speech, movement, and interaction with the environment and other avatars. At block 216, the environmental rendering may be generated by the modeling and rendering engine 112b. It is appreciated that part of the retrieval of stored data that may occur at block 208 may comprise the retrieval of already-rendered environmental models that may be associated with the EMS 106, the first device 102, and/or the second device 104. It is appreciated that the stored model(s) may be updated, revised, or added to for a one-time or predetermined length or number of uses, for example, by a particular device 102 or 104 or by a combination of devices, as a part of method 200.

In an embodiment, the environmental rendering generated at block 216 that may comprise stored data may comprise a plurality of static elements 216a and a plurality of selectable elements 216b. Each plurality 216a and 216b of elements may be manually determined, or the data collection method at block 206 may be associated with either a static element or a selectable element. In an embodiment, a static element may be defined as an element of an environment that cannot be modified with respect to size, position, functionality, or content by the avatar. In one example, a plurality of static elements associated with the environment may comprise a conference table, at least two walls, windows, a plurality of office furniture comprising at least a desk, a chair, a conference table, and filing cabinets. Static elements may comprise elements that are not moved or interacted with when the avatars are in the virtual environment. In some embodiments, an element such as a chair may be either static or interactive, and may be designated as such in information previously stored about the environment and/or associated with a user profile of a user in the virtual environment. In another embodiment, virtual elements and spaces such as a virtual whiteboard may be selected/designated by a user or administrator to enable multiple parties to generate, add, delete, and modify information in a shared space or a three-dimensional modeling space configured to enable at least one of the avatars to generate, modify, delete, and otherwise manipulate three-dimensional models.

At block 218, the avatars and renderings generated at blocks 212, 214, and 216, for example, by the rendering application 114b, may be merged by the imaging mixing application 114c to form a virtual environment in which a plurality of users' avatars can interact with each other and with the pluralities of static and interactive elements discussed herein.

At block 220, an at least one update, which may be referred to as an input, may be received from at least one of the devices 102, 104, or the EMS 106. This input may be speech, motion, interaction with an interactive element, designation of an element as static or interactive, or another input associated with the use of the virtual environment such as the addition of an additional wearable device and associated user. At block 222, some or all of the applications 114a, 114b, and 114c, are engaged in dynamic, real-time updates of at least one of the first avatar, the second avatar, or the environment in response to the at least one input received at block 220. The devices 102, 104, and the EMS 106 are configured to be in continuous communication with the computer system 110 the establishment of an interactive session until that session is terminated in order to provide real-time updates to the virtual environment to aid in the immersive experience. In an embodiment where users, other than the users engaged with devices 102 and 104, request or are invited to join the virtual environment, the telecommunications platform associated with the device(s) worn by the new users is configured to communicate with the servers 112a, 112b, and 112c, to update the virtual environment with a newly generated avatar. In an embodiment, users may be invited to join an interactive session by an administrator or another user, depending upon the rights and permissions associated with the user profiles of the users engaged and immersed in the virtual environment.

In an embodiment, the input received at block 220 may cause the environmental information stored in the data stores discussed herein to be updated and saved. In an alternate embodiment, when the input at block 220 is received from the EMS 106, the input may be associated with a quasi-interactive element that may be loaded from the server 118 in FIG. 1. In this embodiment, the computer system 110 may be in communication with the server 118 to not only load the quasi-interactive element, but also to save modifications to or permissions associated with quasi-interactive element on the server 118 instead of or in addition to on the computer system 110.

In an embodiment, at block 224 the quasi-interactive element may be saved at predetermined intervals on a dynamic basis or in response to modifications/approvals of modifications, in order to avoid losing work in the event of an interruption to or disconnection from the system 100 by one or more users. In some embodiments, the virtual whiteboard or three-dimensional model may be exported by way of the network 108 to a server on or outside of the computer system 110, for example, the server 118 and/or its associated data store 122.

Figure 3:
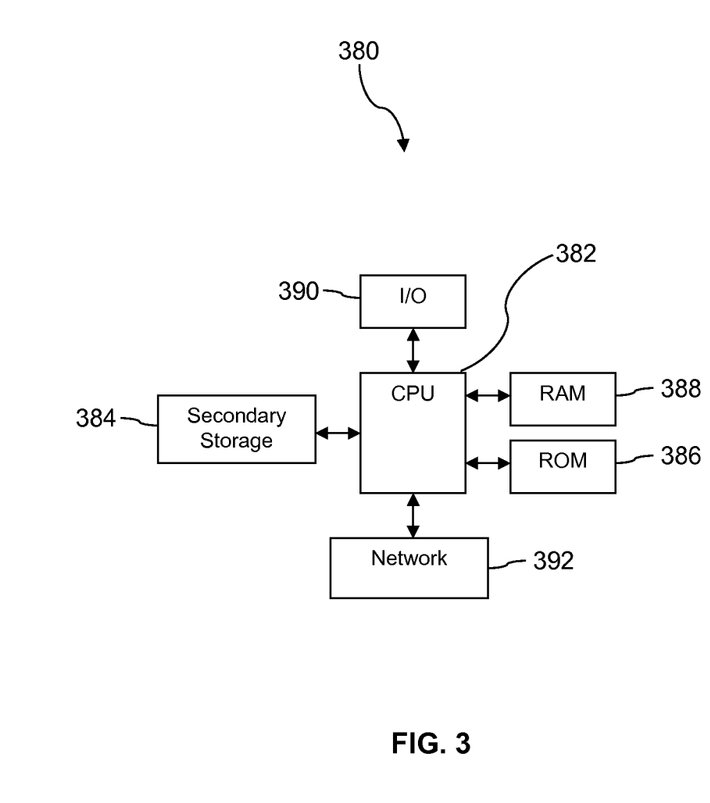
FIG. 3 illustrates an exemplary computer system suitable for implementing embodiments of the present disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for presenting and maintaining an interactive multi-user virtual space, comprising:
a first device engaged with a first user in a first real-world location and configured to communicate with a network, wherein the first device comprises a first video camera, a first microphone, a first stereo headphone, and a first binocular video monitor;
a second device engaged with a second user in a second real-world location and configured to communicate with the network, wherein the second device comprises a second video camera, a second microphone, a second stereo headphone, and a second binocular video monitor, wherein the first real-world location is not shared with the second real-world location such that the first real-world location is not visible to the second user or the second real-world location is not visible to the first user;
a plurality of environment-monitoring components configured to communicate with the network and configured to obtain a plurality of information about an environment; and
an application, configured to communicate with the network, stored on a non-transitory medium and executable by a processor, wherein the application:
receives a first plurality of input from the first device;
receives a second plurality of input from the second device;
receives a plurality of environmental input from the plurality of environment-monitoring components;
generates, based upon the first plurality of input, a first avatar;
generates, based upon the second plurality of input, a second avatar;
merges the first avatar associated with the first user in the first real-world location, the second avatar associated with the second user in the second real-world location, and the plurality of environmental input;
generates, in response to the merger, a mixed reality virtual environment comprising the first avatar, the second avatar, and the plurality of environmental input, wherein the plurality of environmental input comprises at least one image of an object existing at a physical real-world location captured by at least one of the plurality of environment-monitoring components, wherein the mixed reality virtual environment is a purely virtual representation that combines digitally generated components including at least the first avatar and the second avatar with the image of the object existing at the physical real-world location and included among the plurality of environmental input and a composite of virtual representations of both the first real-world location and the second real-world location, wherein the first user sees the second avatar in the virtual representation of the second real-world location and the second user sees the first avatar in the virtual representation of the first real-world location, and wherein each element of the mixed virtual reality environment is calculated and generated to adhere to principles of occlusion;
presents the mixed reality virtual environment to the first user via the first binocular video monitor and the second user via the second binocular video monitor;
generates a virtual element and places the virtual element in a location in the mixed reality virtual environment, wherein the virtual element is capable of receiving interaction input from both the first user and the second user to create a shared interaction experience emulating an interaction experience associated with a physical world analog to the virtual element, and wherein the virtual element does not exist in the plurality of environmental input;
receives at least one action input from the first device;
dynamically updates the virtual element of the mixed reality virtual environment based on the at least one action input from the first device, enabling the first user and the second user to experience the dynamic update in real-time;
receives at least one action input from the second device; and
dynamically updates the virtual element of the mixed reality virtual environment based on the at least one action input from the second device, enabling the first user and the second user to experience the dynamic update in real-time, wherein the first binocular video monitor and the second binocular video monitor enable the first user and the second user to only view the mixed reality virtual environment while engaged with the first device and the second device.

2. The system of claim 1, wherein the first device further comprises, a first plurality of echolocation sensors, a first plurality of orientation sensors, and a first telecommunication interface, and wherein the second device further comprises a second plurality of echolocation sensors, a second plurality of orientation sensors, and a second telecommunication interface.

3. The system of claim 1, wherein the application comprises an orientation analyzer, an articulatory gesture decoder, and a three-dimensional rendering engine.

4. The system of claim 3, wherein the application is configured to mirror speech of the first user on the first avatar in real-time by translating phonemes of a plurality of individual syllables of the speech into movement of a plurality of facial features of the first avatar.

5. The system of claim 1, wherein the at least one action input comprises speech or movement by the first user, speech or movement of the second user, generation of a new interactive element, modification of an interactive element, and activity associated with a static element.

6. The system of claim 5, wherein the generation of the new interactive element comprises combining, by the application, the new interactive element with the mixed reality virtual environment, wherein the new interactive element comprises a virtual whiteboard or a modeling space.

7. The system of claim 5, wherein at least one of a profile associated with the first user and a profile associated with the second user is configured to at least one of generate, modify, accept changes, reject changes, and delete the new interactive element.

8. The system of claim 5, further comprising dynamically updating, by the application, the mixed reality virtual environment in response to receiving an input associated with the new interactive element, wherein the input comprises a modification, an accepted change, or a rejected change.

9. A system for generating and maintaining a multi-user interactive mixed reality virtual environment, comprising:
- a computer system on a network comprising a server, a data store, and a processor, wherein the data store comprises a plurality of user profiles and a plurality of stored environment information received from a plurality of environmental sensors associated with at least one environment and comprising a plurality of virtual elements;
- a first wearable electronic communication device in communication with the network and engaged with a first user in a first real-world location and comprising a first video camera, a first microphone, a first stereo headphone, a first binocular video monitor, a first plurality of echolocation sensors, a first plurality of orientation sensors, and a first telecommunication interface;
- a second wearable electronic communication device in communication with the network and engaged with a second user in a second real-world location and comprising a second video camera, a second microphone, a second stereo headphone, a second binocular video monitor, a second plurality of echolocation sensors, a second plurality of orientation sensors, and a second telecommunication interface, wherein the first real-world location is not shared with the second real-world location such that the first real-world location is not visible to the second user or the second real-world location is not visible to the first user;
- an application stored in the server in a non-transitory memory and executable by the processor;
- wherein the application:
  - receives a request to initiate an interactive session,
  - receives information from the first wearable electronic communication device and the second wearable electronic communication device via the first telecommunication interface and the second telecommunication interface;
  - generates, based upon the information received from the first wearable electronic communication device and the second wearable electronic communication device, a first avatar associated with the first wearable device and a second avatar associated with the second wearable electronic communication device;
  - merges the first avatar associated with the first user in the first real-world location and the second avatar associated with the second user in the second real-world location with at least some of the plurality of stored environment information associated with the at least one environment;
  - generates, based upon the merger and to initiate the interactive session, a first mixed reality virtual environment comprising the first avatar, the second avatar, and the at least some of the plurality of stored environment information, wherein at least some of the stored environment information comprises at least one image of an object existing at a physical real-world location captured by at least one of the plurality of environmental sensors, wherein the mixed reality virtual environment is a purely virtual representation that combines digitally generated components including at least the first avatar and the second avatar with the image of the object existing at the physical real-world location and included among the stored environment information and a composite of virtual representations of both the first real-world location and the second real-world location, wherein the first user sees the second avatar in the virtual representation of the second real-world location and the second user sees the first avatar in the virtual representation of the first real-world location, and wherein each element of the first mixed virtual reality environment is calculated and generated to adhere to principles of occlusion;
  - presents, subsequent to generating, the first mixed reality virtual environment to the first user via the first wearable electronic device and the second user via the second wearable electronic device;
  - generates a virtual element and places the virtual element in a location in the mixed reality virtual environment, wherein the virtual element is capable of receiving interaction input from both the first user and the second user to create a shared interaction experience emulating an interaction experience associated with a physical world analog to the virtual element, and wherein the virtual element does not exist in the stored environmental information;
  - receives at least one action input from the first wearable electronic communication device, wherein the at least one action input from the first wearable electronic communication device comprises motion input or speech input;
  - updates, based on the at least one action input from the first wearable electronic communication device, the virtual element;
  - receives at least one action input from the second wearable electronic communication device, wherein the at least one action input from the second wearable electronic communication device comprises motion input or speech input; and
  - updates, based on the at least one action input from the second wearable electronic communication device, the virtual element.

10. The system of claim 9, wherein the first wearable electronic communication device further comprises a first accelerometer and a first gesture recording component, and wherein the second wearable electronic communication device further comprises a second accelerometer and a second gesture recording component.

11. The system of claim 9, wherein the first wearable electronic communication device comprises a headset, a data suit, an exoskeleton, a plurality of individual sensors, or combinations thereof.

12. The system of claim 9, wherein the first telecommunication interface and the second telecommunication interface employ at least one of code division multiple access (CDMA), global system for mobile communications (GSM), long-term evolution (LTE), worldwide interoperability for microwave access (WiMAX), near field communications (NFC), and radio frequency identity (RFID) to communicate with the network.

13. The system of claim 9, further wherein the application receives a plurality of new environmental information from a different environment than the plurality of stored information from the first environment.

14. The system of claim 13, further comprising updating the first mixed reality virtual environment based upon the plurality of new environmental information to comprise a different plurality of virtual elements from the different environment.

15. The system of claim 9, further comprising receiving, by the application, a second input, wherein the second input comprises an update to an interactive element of the plurality of elements, wherein the second input at least one of modifies the interactive element or changes the permissions to at least one of access or modify the interactive element.

16. The system of claim 15, wherein the interactive element comprises a virtual board or a modelling space.

17. The system of claim 15, wherein the second input is received from the plurality of environmental sensors in communication with the network, wherein the second input is associated with an interactive element and comprises at least one of an action or a permission, wherein a user profile of the plurality of profiles is updated in response to the second input of the at least one permission or the data store is updated in response to the second input of the action.

18. A method for generating and maintaining a multi-user interactive mixed reality virtual environment by an application stored in a non-transitory memory of a computer system and executable by a processor, comprising:

receiving a request to initiate an interactive session, a plurality of inputs from a first wearable device, and a plurality of inputs from a second wearable device, wherein the first wearable device is engaged with a first user in a first real-world location and comprises a first video camera, a first microphone, a first stereo headphone, and a first binocular video monitor, wherein the second wearable device is engaged with a second user in a second real-world location and comprises a second video camera, a second microphone, a second stereo headphone, and a second binocular video monitor, and wherein the first real-world location is not shared with the second real-world location such that the first real-world location is not visible to the second user or the second real-world location is not visible to the first user;

generating based upon the pluralities of inputs received from the first wearable device and the second wearable device, a first avatar associated with the first wearable device and a second avatar associated with the second wearable device;

merging the first avatar associated with the first user in the first real-world location and the second avatar associated with the first user in the second real-world location with a plurality of environmental data stored on the data store to generate a mixed reality virtual environment, wherein the plurality of environmental data includes at least one image of an object existing at a physical real-world location captured by an environment-monitoring component, wherein the mixed reality virtual environment is a purely virtual representation that combines digitally generated components including at least the first avatar and the second avatar with the image of the object existing at the physical real-world location and included among the plurality of environmental data and a composite of virtual representations of both the first real-world location and the second real-world location, wherein the first user sees the second avatar in the virtual representation of the second real-world location and the second user sees the first avatar in the virtual representation of the first real-world location, and wherein each element of the mixed virtual reality environment is calculated and generated to adhere to principles of occlusion;

presenting to the first user via the first wearable device and the second user via the second wearable device, the mixed reality virtual environment;

generating a virtual element and placing the virtual element in a location in the mixed reality virtual environment, wherein the virtual element is capable of receiving interaction input from both the first user and the second user to create a shared interaction experience emulating an interaction experience associated with a physical world analog to the virtual element, and wherein the virtual element does not exist in the plurality of environmental data;

receiving at least one action input from the first wearable device, wherein the at least one action input from the first wearable device comprises motion input or speech input;

dynamically updating, in real-time, and in response to the at least one action input from the first wearable device, the virtual element;

receiving at least one action input from the second wearable device, wherein the at least one action input from the second wearable device comprises motion input or speech input; and dynamically updating, in real-time, and in response to the at least one action input from the second wearable device, the virtual element.

19. The method of claim 18, wherein the first device further comprises a first plurality of echolocation sensors, a first plurality of orientation sensors, and a first telecommunication interface, and wherein the second wearable device further comprises a second plurality of echolocation sensors, a second plurality of orientation sensors, and a second telecommunication interface.

20. The method of claim 18, wherein the plurality of environmental data was previously associated with a profile associated with at least one of the first user or the second user.

* * * * *